(12) United States Patent
Nugent, Jr.

(10) Patent No.: US 10,020,615 B2
(45) Date of Patent: Jul. 10, 2018

(54) AUTOMATIC POWER LINE DISCONNECT APPARATUS

(71) Applicant: Kussmaul Electronics Co., Inc., West Sayville, NY (US)

(72) Inventor: Thomas H. Nugent, Jr., Port Jefferson Station, NY (US)

(73) Assignee: Kussmaul Electronics, LLC, West Sayville, NY (US)

( * ) Notice: Subject to any disclaimer, the term of this patent is extended or adjusted under 35 U.S.C. 154(b) by 0 days.

(21) Appl. No.: 15/600,442

(22) Filed: May 19, 2017

(65) Prior Publication Data

US 2017/0271816 A1     Sep. 21, 2017

Related U.S. Application Data

(63) Continuation of application No. 15/073,404, filed on Mar. 17, 2016, now Pat. No. 9,685,734.

(51) Int. Cl.
| | |
|---|---|
| *H01R 13/635* | (2006.01) |
| *B60R 16/02* | (2006.01) |
| *H01R 13/66* | (2006.01) |
| *H01R 13/703* | (2006.01) |

(52) U.S. Cl.
CPC ......... *H01R 13/635* (2013.01); *B60R 16/02* (2013.01); *H01R 13/6683* (2013.01); *H01R 13/7031* (2013.01)

(58) Field of Classification Search
CPC .............. H01R 13/635; H01R 13/7032; H01R 13/641; H01R 13/633; H01R 13/6335

USPC ................. 439/188, 159, 160, 489
See application file for complete search history.

(56) References Cited

U.S. PATENT DOCUMENTS

| | | | |
|---|---|---|---|
| 3,431,428 A | 3/1969 | Valer | |
| 3,475,715 A | 10/1969 | Venaleck | |
| 4,157,855 A | 6/1979 | Chan | |
| 5,266,040 A | 11/1993 | Merrill | |
| 5,645,439 A | 7/1997 | Nugent, Jr. et al. | |
| 5,800,189 A | 9/1998 | Ahmed | |
| 5,831,802 A | 11/1998 | Ahmed | |
| 6,540,533 B1 | 4/2003 | Schreiber | |
| 7,044,759 B2 | 5/2006 | Hughes | |
| 7,431,601 B2 | 10/2008 | Nugent, Jr. et al. | |
| 7,458,842 B1 | 12/2008 | Gange | |
| 9,365,116 B2 | 6/2016 | Staley | |
| 2005/0282419 A1* | 12/2005 | Schlack | H01R 13/633 439/152 |
| 2011/0189885 A1 | 8/2011 | Tsai | |

* cited by examiner

*Primary Examiner* — Gary Paumen

(57) ABSTRACT

A power line disconnect apparatus includes a housing; an electrical connector that projects from a surface of a connector plate coupled to the housing, the electrical connector configured to receive a plug of a power cable; an ejector pin configured to project through a first aperture in the connector plate and eject the plug from the electrical connector; a microswitch configured to activate and deactivate a power circuit associated with the power cable; and a sensor pin configured to project through a second aperture in the connector plate, the sensor pin having a sensor pin extension, the sensor pin extension configured to control the microswitch.

8 Claims, 6 Drawing Sheets

AUTOMATIC POWER LINE DISCONNECT APPARATUS

CROSS-REFERENCE TO RELATED APPLICATIONS

This application is a continuation of U.S. patent application Ser. No. 15/073,404 filed on Mar. 17, 2016, which is hereby incorporated by reference in its entirety.

TECHNICAL FIELD

This disclosure is directed generally to electrical connections and more particularly to a power line auto-disconnect apparatus for use with an electrical power connection.

BACKGROUND

Emergency vehicles (such as fire trucks and ambulances), recreational vehicles, and power boats, often utilize power lines that are connected to stationary power sources for supplying electrical power for starting engines, charging batteries, and other purposes. However, such vehicles may need to uncouple swiftly from the power line when they are to be driven away in response to an emergency, or the like. Consequently, the mating power line plug should eject on activation of the vehicle's engine, and also should eject in a manner that reduces or eliminates drawing an arc between the plug and the vehicle connector. Arcing, if not suppressed, is a major source of wear on contacts in both the vehicle connector and the plug. It is this wear that significantly reduces the service life of these components.

SUMMARY

This disclosure provides a power line auto-disconnect apparatus for use in an electrical power connection.

In a first embodiment, a power line disconnect apparatus includes a housing; an electrical connector that projects from a surface of a connector plate coupled to the housing, the electrical connector configured to receive a plug of a power cable; an ejector pin configured to project through a first aperture in the connector plate and eject the plug from the electrical connector; a microswitch configured to activate and deactivate a power circuit associated with the power cable; and a sensor pin configured to project through a second aperture in the connector plate, the sensor pin having a sensor pin extension, the sensor pin extension configured to control the microswitch.

In a second embodiment, a vehicle includes an engine and a power line disconnect apparatus attached to a surface of the vehicle. The power line disconnect apparatus includes a housing; an electrical connector that projects from a surface of a connector plate coupled to the housing, the electrical connector configured to receive a plug of a power cable; an ejector pin configured to project through a first aperture in the connector plate and eject the plug from the electrical connector; a microswitch configured to activate and deactivate a power circuit associated with the power cable and the vehicle; and a sensor pin configured to project through a second aperture in the connector plate, the sensor pin having a sensor pin extension, the sensor pin extension configured to control the microswitch.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The figures, discussed below, and the various embodiments used to describe the principles of the present disclosure in this patent document are by way of illustration only and should not be construed in any way to limit the scope of this disclosure. Those skilled in the art will understand that the principles of the present disclosure may be implemented in any type of suitably arranged device or system.

As described above, some vehicles—particularly emergency vehicles—may need to quickly uncouple a connected power line when the vehicles are to be driven away in response to an emergency, or the like. Consequently, the mating power line plug should eject on activation of the vehicle's engine, but also it must eject in a manner that reduces or eliminates drawing an arc between the plug and the vehicle. Arcing, if not suppressed, is a major source of wear on contacts in both the vehicle connector and the plug. It is this wear that significantly reduces the service life of these components.

To address these and other issues, embodiments of this disclosure provide a power line auto-disconnect apparatus that includes a sealed housing on which an electrical connector is mounted. Typically, the power line auto-disconnect apparatus is mounted (or otherwise coupled) to a sidewall or other body portion of an emergency vehicle (e.g., a fire truck or ambulance), a recreational vehicle, or a power boat. During use, the electrical connector mates with an electrical plug that is part of a shore cable. Once connected, the shore cable is electrically coupled to an engine starting circuit or battery on the vehicle. Voltage that is applied to the starter when the engine is cranked is also applied to a solenoid in the automatic power line disconnect apparatus. The solenoid operates an ejector mechanism which is mounted in the housing. The ejector mechanism ejects the shore cable from the apparatus, and a switch that is mounted in the housing interrupts the current prior to the completion of the ejection action, thereby preventing arcing at the connector contacts and assuring long contact life.

FIGS. 1 through 5 illustrate various views of an auto-disconnect apparatus 100 for use in an electrical power connection, according to this disclosure. The embodiments of the auto-disconnect apparatus 100 illustrated in FIGS. 1 through 5 are for illustration only. Other embodiments could be used without departing from the scope of this disclosure.

Figure 1:
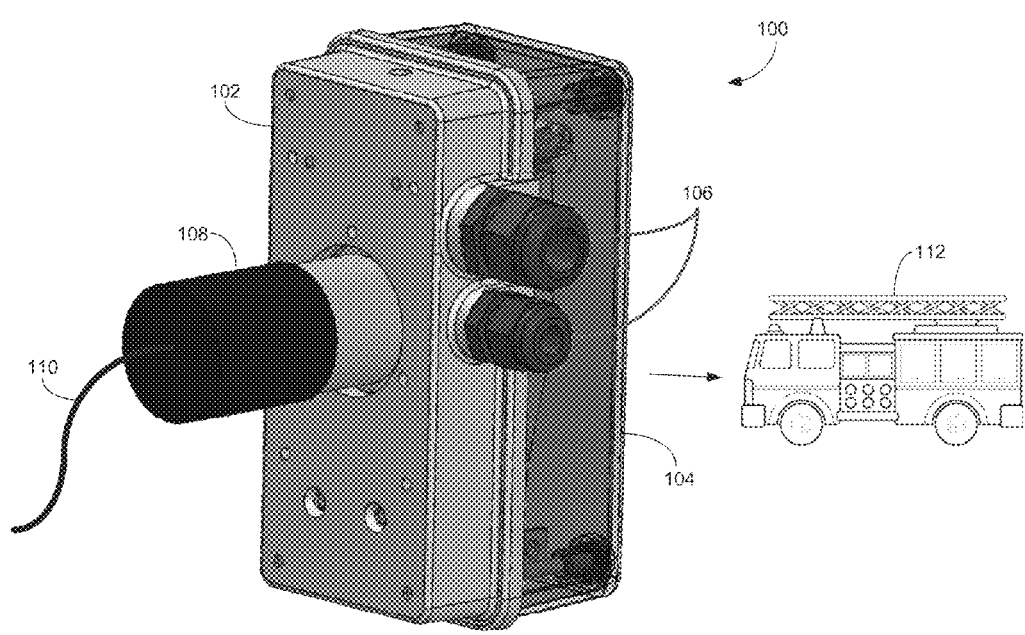
FIG. 1 shows an external perspective view of an auto-disconnect apparatus for use in an electrical power connection, according to this disclosure.
Figure 4:
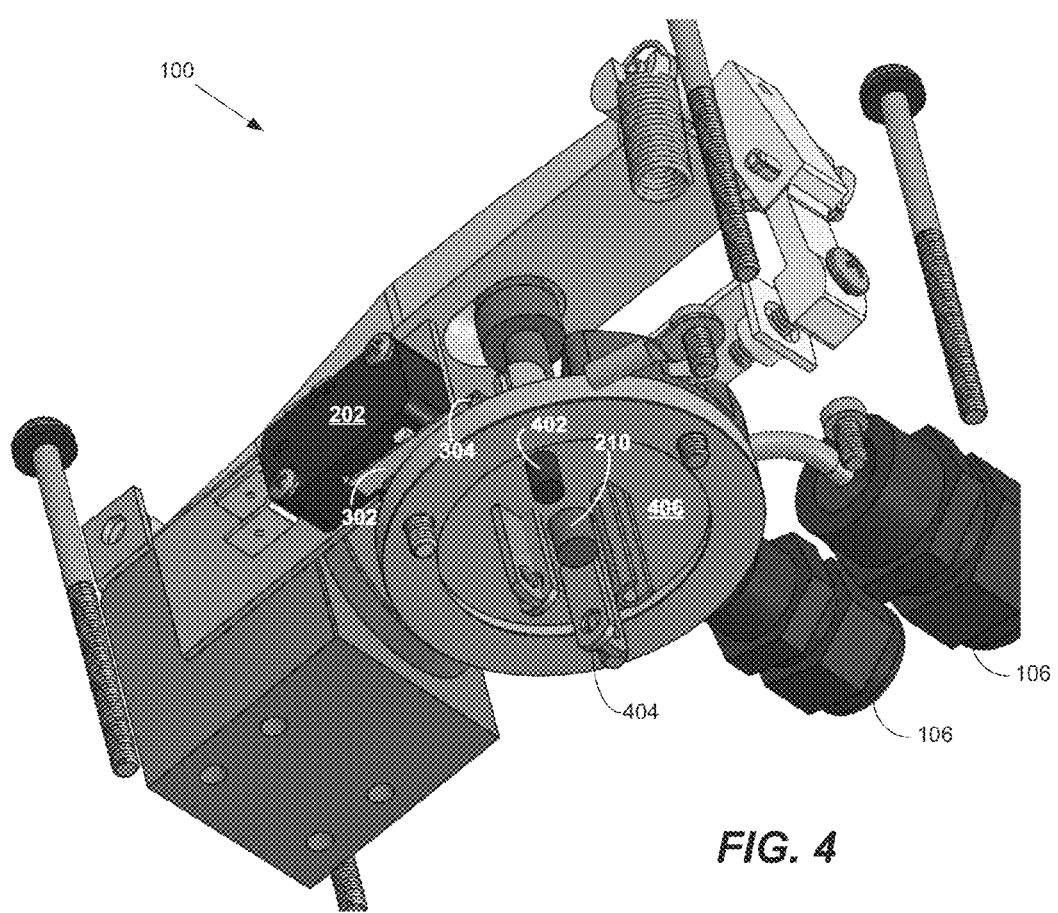
FIG. 4 shows yet another perspective view of the auto-disconnect apparatus of FIG. 1 from a different angle.

FIG. 1 shows an external perspective view of the auto-disconnect apparatus 100. The auto-disconnect apparatus 100 includes a housing comprising a front housing 102 and a rear housing 104. A part of the housing (e.g., the front housing 102) includes multiple wire ports 106. Typically, there are two wire ports 106, although in some embodiments there may be more or fewer wire ports 106. As shown in FIG. 1, a plug 108 is engaged with the front housing 102 of the auto-disconnect apparatus 100, concealing a male connector (which is shown in FIG. 4 as the male connector 404). The plug 108 is at the end of a shore cable 110. The plug 108 and the shore cable 110 are not part of the auto-disconnect apparatus 100.

The auto-disconnect apparatus 100 is typically coupled to a vehicle 112 (e.g., mounted to a sidewall of the vehicle 112) and electrically coupled to a battery charger or other device on the vehicle 112 that requires alternating current power. The auto-disconnect apparatus 100 may include one or more mounting or attachment components (e.g., brackets, fasteners, mounting holes, and the like) to secure the auto-disconnect apparatus 100 to the vehicle 112.

Figure 2:
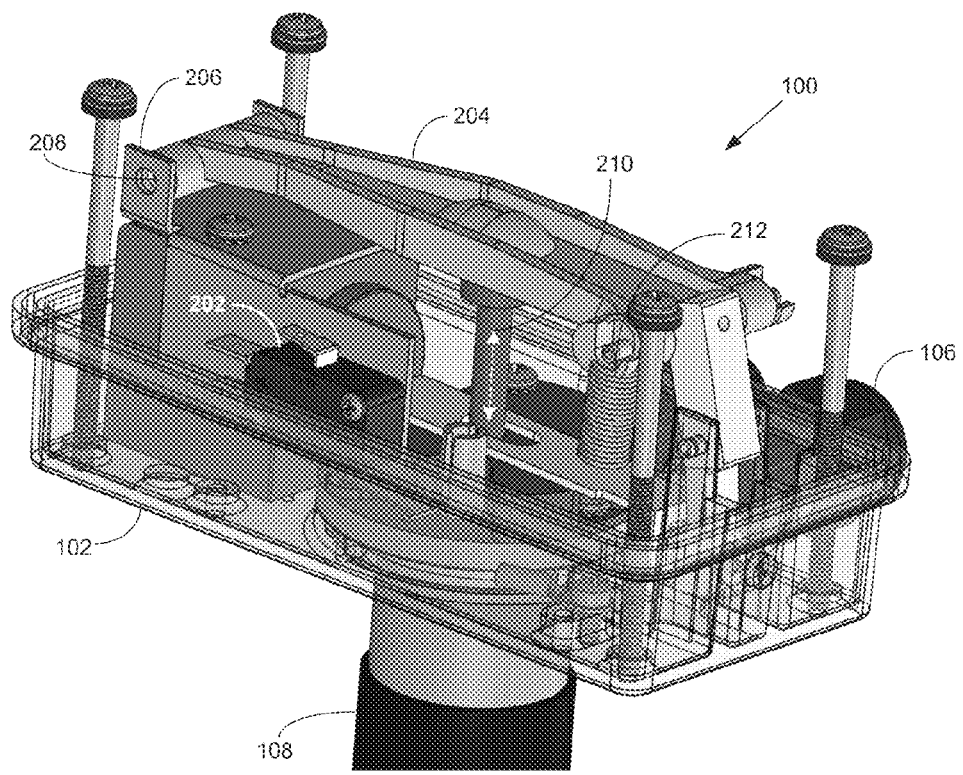
FIG. 2 shows a perspective view of the auto-disconnect apparatus of FIG. 1 from another angle.

FIG. 2 shows a perspective view of the auto-disconnect apparatus 100 from another angle with the rear housing 104 removed and the front housing 102 shown in transparent view. In FIG. 2, various internal components of the auto-disconnect apparatus 100 are visible, including a microswitch 202, an ejector arm 204, a support bracket 206, a pin 208, and tension springs 212.

The microswitch 202 activates and deactivates a power circuit that includes the shore cable 110, the auto-disconnect apparatus 100, and the vehicle 112, as described in greater detail below. When the microswitch 202 activates the power circuit, power can be supplied from the cable 110 through the auto-disconnect apparatus 100, to the vehicle 112. When the microswitch 202 deactivates the power circuit, no current flows from the cable 110 to the vehicle 112. In some embodiments, the microswitch 202 includes three contacts: normally open (NO), normally closed (NC), and common (C).

One end of the ejector arm 204 is pivotally mounted on the support bracket 206 by means of the pin 208. The ejector arm 204 makes contact with the ejector pin 210 at approximately a mid-point of the ejector arm 204. The ejector pin 210 is configured to move longitudinally back and forth, as indicated by the dashed arrows. A pair of tension springs 212 (only one of which is visible in FIG. 2) coupled to the second end of the ejector arm 204 provide continuous force on the ejector arm 204 and the ejector pin 210 in the direction of the plug 108.

Figure 3:
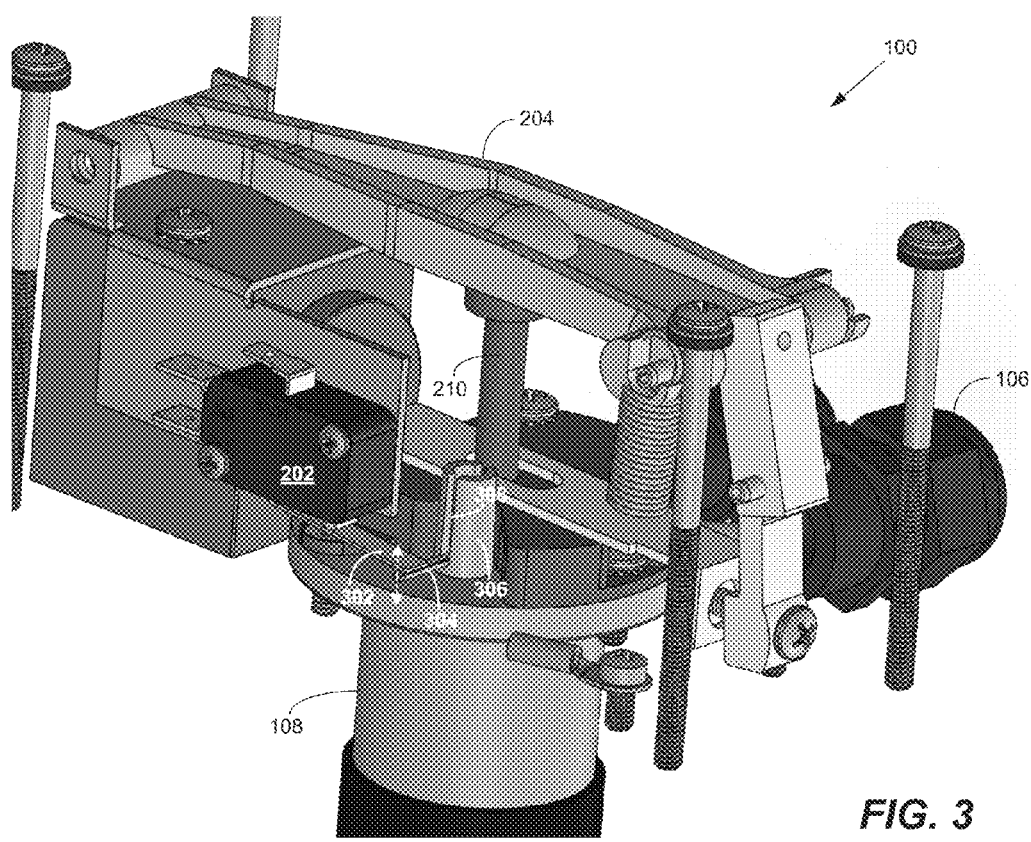
FIG. 3 shows another perspective view of the auto-disconnect apparatus of FIG. 1.

FIG. 3 shows a perspective view of the auto-disconnect apparatus 100 with both the front housing 102 and the rear housing 104 removed. In this view, it can be seen that the microswitch 202 includes a microswitch arm 302, one end of which is connected to and selectively activates and deactivates the microswitch 202 in response to movement of the microswitch arm 302. The microswitch arm 302 extends away from the microswitch 202 and, at the end of the microswitch arm 302, makes contact with a sensor pin extension 304. The sensor pin extension 304 is fixedly coupled to and extends laterally outward from a sensor pin 402, which is not visible in FIG. 3, but can be seen in FIGS. 4 and 5. The sensor pin 402 is configured to move longitudinally within a sensor pin guide 306, in a direction of movement that is substantially parallel to the movement of the ejector pin 210, as indicated by the dashed arrows in FIG. 5. The sensor pin guide 306 is generally cylindrical and fixedly secured inside the auto-disconnect apparatus 100.

The sensor pin guide 306 constrains and guides the movement of the sensor pin 402. The sensor pin guide 306 also includes a side opening 308 that extends through and longitudinally along a wall of the sensor pin guide 306. The sensor pin extension 304 protrudes from the sensor pin 402 through the side opening 308 and extends to make contact with the microswitch arm 302, as shown in FIG. 3.

Figure 5:
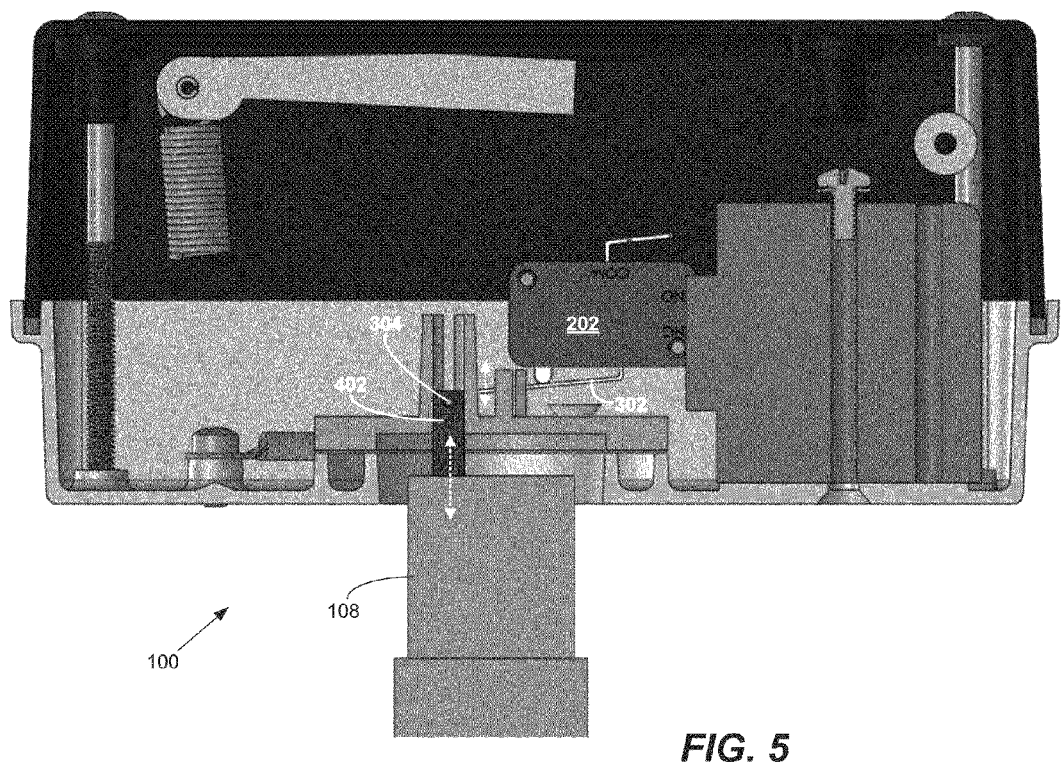
FIG. 5 shows a side section view of the auto-disconnect apparatus of FIG. 1 with a plug connected to the auto-disconnect apparatus.

FIG. 4 shows another perspective view from a different angle of the auto-disconnect apparatus 100 with both the front housing 102 and the rear housing 104 removed. In this view, the plug 108 is not coupled to the auto-disconnect apparatus 100. Without the plug 108, it can be seen that the auto-disconnect apparatus 100 includes the sensor pin 402 and a male connector 404. The male connector 404 extends outside of the front housing 102 so as to be visible from the exterior. Of course, in some embodiments, the male connector 404 may be protected by a cover that is moveable to reveal the male connector 404. A connector plate 406 is coupled to the front housing 102 and surrounds the male connector 404. The sensor pin 402 and the ejector pin 210 pass through respective apertures of the connector plate 406. The sensor pin 402 is spring loaded to be biased in an outward position, such as shown in FIG. 4. The male connector 404 is configured to engage with a female connector at the end of the plug 108. FIG. 5 shows a side section view of the auto-disconnect apparatus 100 with the plug 108 connected to the auto-disconnect apparatus 100. When connected, the male connector 404 and the plug 108 form an electrical connection for electrical current to flow from the shore line 110 to the auto-disconnect apparatus 100 and to the vehicle 112. Typically, the electrical current is provided at 110V or 220V, although any suitable electrical source at any suitable voltage could be used.

As shown in FIG. 4, the contacts of the male connector 404 are significantly longer than the projection of the sensor pin 402. However, the exposed portion of the ejector pin 210 is longer than the contacts of the male connector 404 when the ejector pin 210 is fully extended outward. In one aspect of operation, as the plug 108 is inserted for engagement with the auto-disconnect apparatus 100, the plug 108 first makes contact with the ejector pin 210 and then with the contacts of the male connector 404. As the plug 108 is inserted, the plug 108 pushes the ejector pin 210 inward and the female connector of the plug 108 slides over the contacts of the male connector 404. The movement of the ejector pin 210 pushes the ejector arm 204 inward, against the force of the tension springs 212. As the plug 108 is further inserted, the plug 108 contacts the sensor pin 402 and pushes the sensor pin 402 inward, while also continuing to depress the ejector pin 210. The sensor pin 402 moves with the connected sensor pin extension 304, which in turn depresses the microswitch arm 302 inward. When the plug 108 is fully engaged against the connector plate 406, a trigger locks the ejector arm 204 into position. With the microswitch arm 302 depressed inward, the microswitch 202 and corresponding power circuit are activated to apply power from the plug 108 to the auto-disconnect apparatus 100 and to the vehicle 112. Any electrical arcing that may result from the activation of the electrical current when the plug 108 is engaged with the auto-disconnect apparatus 100 would occur inside the microswitch 202, which is constructed to absorb arcing occurrences.

Typically, when the shore cable 110 is plugged into the auto-disconnect apparatus 100, the shore cable 110 will remain plugged in until the vehicle 112 is started. When the vehicle 112 is started (e.g., when the vehicle's engine is started), a solenoid (not shown) in the auto-disconnect apparatus 100 releases the trigger that frees the ejector arm 204 from its locked position. The tension springs 212 cause movement of the ejector arm 204 towards the plug 108, which in turn causes the ejector arm 204 to advance the ejector pin 210 toward the plug 108. This is turn pushes the plug 108 out, and decouples the plug 108 from the male connector 404 and the auto-disconnect apparatus 100.

In some similar auto-disconnect systems, if a shore cable is manually unplugged and the vehicle is not started, the current through the shore cable would continue to flow until the moment that the plug is disconnected from the auto-disconnect system. This situation could create an arc at the male connector and/or the plug, thereby shortening the life of the connectors.

To avoid such an occurrence, the auto-disconnect apparatus 100 uses the position of the sensor pin 402 and the sensor pin extension 304 to control the current into the auto-disconnect apparatus 100. When the sensor pin 402 is depressed by the plug 108, the sensor pin extension 304 presses on the microswitch arm 302, thereby activating the power circuit, which applies power from the plug 108 to the auto-disconnect apparatus 100 and to the vehicle 112. When the shore cable 110 is unplugged, as the plug 108 is decoupled from the connector plate 406, the spring-biased sensor pin 402 moves outward and the connected sensor pin extension 304 moves with the sensor pin 402. The movement of the sensor pin extension 304 causes the microswitch arm 302 to move outward and causes the microswitch 202 and corresponding power circuit to be deactivated. This stops the current flow through the male connector 404, the plug 108, and the shore cable 110. Because the full movement of the sensor pin 402 is less than the length of the contacts of the male connector 404, the outward movement of the microswitch arm 302, sensor pin extension 304, and sensor pin 402 are completed (and thus the power circuit is interrupted) before the plug 108 is fully disengaged from the male connector 404. This ensures that no arcing can occur at the male connector 404 and/or the plug 108.

Because the sensor pin 402 and sensor pin extension 304 are not directly coupled to the ejector pin 210 or the ejector arm 204, the movement of the pin 402 and extension 304 (and their control of the microswitch 202) is not dependent on the position of the ejector pin 210 or the ejector arm 204. Stated another way, the control of the microswitch 202 and the power circuit are independent of the position of the ejector pin 210. Thus, even if the plug 108 is manually removed and the ejector pin 210 is not released, the power circuit will still be interrupted before the plug 108 is completely removed. Thus, the potential for arcing at the male connector 404 and/or the plug 108 is negligible regardless of whether the plug 108 is manually removed or auto-ejected by the start of the vehicle 112.

Figure 6:
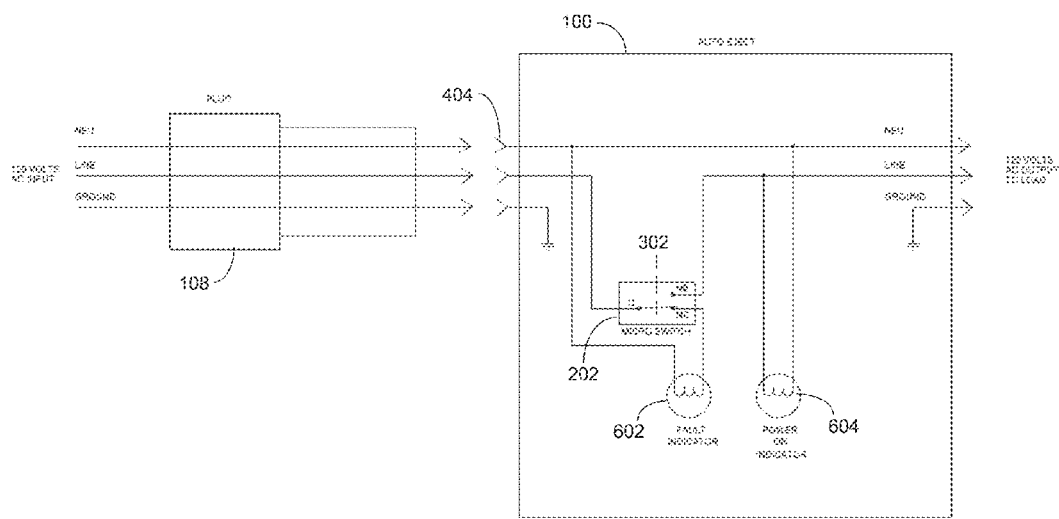
FIG. 6 illustrates an electrical schematic diagram of the auto-disconnect apparatus of FIG. 1.

FIG. 6 illustrates an electrical schematic diagram of the auto-disconnect apparatus 100. As shown in FIG. 6, the plug 108 includes neutral, line, and ground connections that are configured to couple with corresponding contacts in the male connector 404. The microswitch 202 includes three contacts: normally open (NO), normally closed (NC), and common (C). The NC contact is not used in normal operation. A fault indicator 602 is connected to the NC contact. In some embodiments, if the plug 108 is inserted and a fault occurs in the power circuit of the auto-disconnect apparatus 100, the fault indicator 602 will illuminate. A power indicator 604 is connected to the NO contact. When the plug 108 is inserted and the auto-disconnect apparatus 100 is operating correctly, the power indicator 604 will illuminate. In some embodiments, the fault indicator 602 and the power indicator 604 are LED lamps. However, any other suitable indicator could be used.

Although FIGS. 1 through 6 illustrates one example of an auto-disconnect apparatus 100 for use in an electrical power connection, various changes may be made to the figures. For example, certain ones of the various components of the auto-disconnect apparatus 100 may be combined, rearranged, duplicated, separated into sub-components, or replaced with other components.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit" and "receive," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. A power line disconnect apparatus comprising:
a housing;
a connector plate coupled to the housing;

an ejector pin configured to project through a first aperture in the connector plate and eject a plug of a power cable from an electrical connector projecting from a surface of the connector plate;

a microswitch configured to activate and deactivate a power circuit associated with the power cable; and a sensor pin configured to project through a second aperture in the connector plate, the sensor pin having a sensor pin extension that projects perpendicularly from the sensor pin to contact the microswitch, the sensor pin extension configured to control the microswitch.

2. The apparatus of claim 1, further comprising an ejector arm configured to push the ejector pin outward away from the connector plate when a vehicle coupled to the apparatus is started.

3. The apparatus of claim 2, wherein the sensor pin is configured to depress inward when the plug is inserted over the electrical connector to the connector plate, and project outward when the plug is pulled away from the connector plate.

4. The apparatus of claim 2, wherein the ejector arm is pivotally mounted on a support bracket by a pin.

5. The apparatus of claim 2, wherein the ejector arm is coupled to one or more tension springs that provide a force on the ejector arm in a direction of the electrical connector.

6. The apparatus of claim 1, wherein the electrical connector is a male connector having one or more male connector contacts that are longer than a maximum projection of the sensor pin.

7. The apparatus of claim 1, further comprising a fault indicator coupled to a normally closed (NC) contact of the microswitch, the fault indicator configured to indicate when a fault occurs in the power circuit.

8. The apparatus of claim 1, further comprising a power indicator coupled to a normally open (NO) contact of the microswitch, the power indicator configured to indicate when the apparatus operates normally.

* * * * *